Oct. 27, 1953     C. A. DONALDSON     2,657,380
UNDERGROUND PROSPECTING SYSTEM

Filed Jan. 9, 1950     3 Sheets-Sheet 1

INVENTOR.
CHARLES A. DONALDSON
BY Herman L. Gordon
ATTORNEY

Oct. 27, 1953  C. A. DONALDSON  2,657,380
UNDERGROUND PROSPECTING SYSTEM
Filed Jan. 9, 1950  3 Sheets-Sheet 2
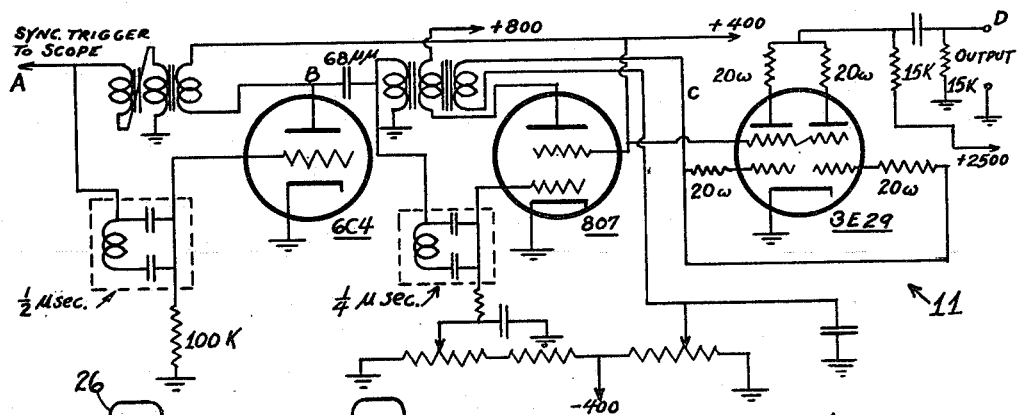
FIG. 4
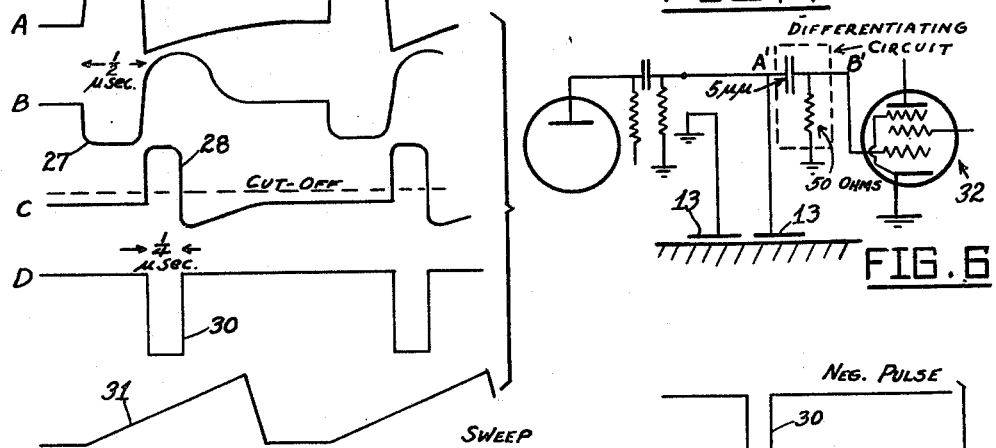
FIG. 5
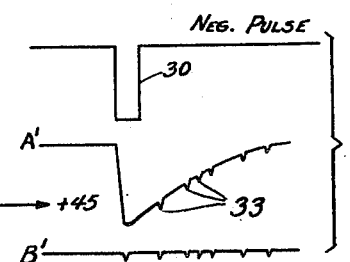
FIG. 6
FIG. 7
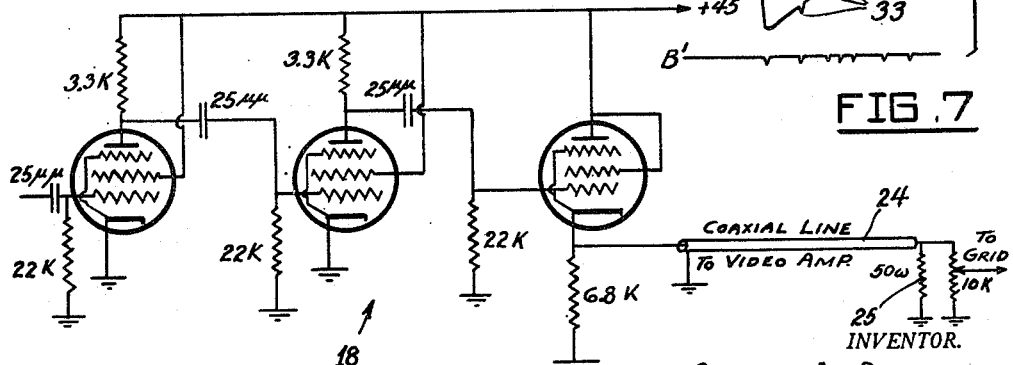
FIG. 8
INVENTOR.
CHARLES A. DONALDSON
BY Herman L. Gordon
ATTORNEY Patented Oct. 27, 1953

2,657,380

UNITED STATES PATENT OFFICE 2,657,380

UNDERGROUND PROSPECTING SYSTEM

Charles A. Donaldson, Del Rio, Tex.

Application January 9, 1950, Serial No. 137,575

6 Claims. (Cl. 343—13)

This invention relates to geophysical prospecting, and more particularly to electrical pulse methods of geophysical prospecting.

A main object of the invention is to provide a novel and improved technique for geophysical prospecting which is very simple, which provides rapid and accurate indications of the location and depth of geological formations, and which requires a minimum amount of apparatus and personnel.

A further object of the invention is to provide an improved electrical pulse technique for locating and determining the depth of geological formations, said technique providing an instantaneous indication at a given station of the depth and arrangement of underground geological strata in the neighborhood of the station, whereby it is possible to plot cross-sectional profiles of underground formations along any desired line by making readings at spaced points along said line, the technique being of great value in mapping geological formations and in locating deposits of minerals, oil, and other valuable substances.

A still further object of the invention is to provide an improved method of geophysical prospecting employing electrical pulses, wherein the locations of underground strata are determined by comparing the reflections of a pulse from the various underground formations at the location under test, the method providing simultaneous indications from all of the underground formations at a single receiving station, whereby the respective depths of the formations in the neighborhood of the receiving station may be shown on a single indicator.

A still further object of the invention is to provide an improved electrical pulse technique of geophysical prospecting by the pulse-reflection method wherein very short, constant-amplitude pulses, of the order of a fraction of a microsecond, are employed, thus enabling reflections from all the underground strata at the location under test to be presented on a single indicator, the indications being presented in such a manner that the relative depths of the different strata may be instantly determined.

A still further object of the invention is to provide an improved electrical means for determining the locations of underground geological formations which involves relatively simple components, which provides very accurate readings, which requires a minimum number of operating personnel, which is highly portable, and which is simple to operate.

A still further object of the invention is to provide an improved electrical pulse apparatus for determining the locations of underground geological formations, said apparatus being relatively inexpensive, being compact in size, providing precise indications of the relative depths of underground formations at the location under test, and which instantaneously determines said depths by a single transmission at the location.

Further objects and advantages of the invention will become apparent from the following description and claims, and from the accompanying drawings, wherein:

Figure 4 is a schematic wiring diagram showing the details of a pulse generator suitable for use as a pulser in method of the present invention.

Figure 5 shows the voltage wave forms present at different points in the pulser circuit of Figure 4 in relation to the sawtooth sweep voltage employed with the cathode ray tube indicator of the receiver, as obtained with the apparatus of the present invention.

Figure 6 is a schematic wiring diagram showing the details of a differentiating circuit suitable for use in the embodiment of the apparatus shown in Figure 2.

Figure 7 shows the voltage wave forms present at different points in the differentiating circuit of Figure 6 in relation to the wave form of the applied pulse.

Figure 8 is a schematic wiring diagram showing the details of a pre-amplifier suitable for use in the form of the invention shown in Figure 1.

Figure 1:
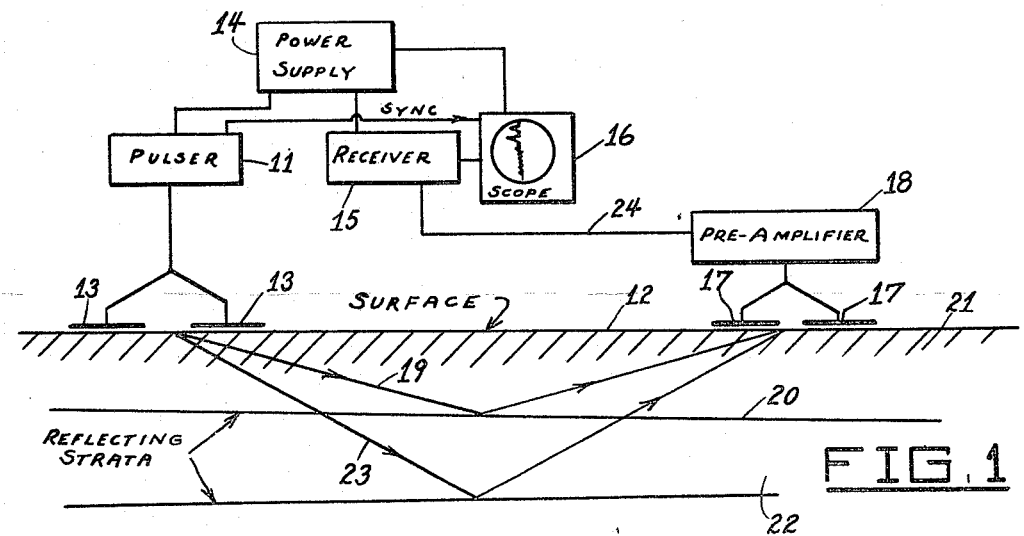
Figure 1 is a block diagram showing schematically one form of apparatus employed in carrying out the method of the present invention.

Various methods of electrical subsurface prospecting have been proposed which employ impulses of electrical energy and which are based on the general procedure of transmitting an electrical impulse to the earth and detecting reflections of the impulse from surfaces of underground geological formations. The methods heretofore employed have not been satisfactory for several reasons. One of the main sources of difficulty in the prior methods has been lack of control of the wave form of the applied pulse, whereby clear-cut individual reflections of the pulse from the respective underground formations have been impossible to display on an oscilloscope screen. In the prior methods, for example, in the method employed in U. S. Patent No. 2,077,707 to Benjamin S. Melton, the pulse is applied in such a manner as to cause disturbing oscillations which may have periods of the same order as the time differences which it is desired to measure, namely, the difference in time between that required for the pulse wave-front to travel from the transmitter to one reflecting stratum and then to the receiver, and that required for the same pulse wave-front to travel from the transmitter to another reflecting stratum and then to the receiver. Furthermore, since the pulse may travel several hundred feet in a microsecond, in order to show up two different pulse paths differing in length by distances of the same order (i. e., by distances of the order of several hundred feet), the duration of the pulse must necessarily be much less than a microsecond in order to provide a distinct indication for each pulse path. Thus, for example, assuming that the velocity in the earth of a given pulse is, say, 45,000 miles per second, i. e., the pulse travels about 250 feet per microsecond, and assuming that a first total reflected path of the pulse to and from a given stratum is 500 feet and a second total reflected path of the pulse to and from an adjacent stratum is 750 feet, there would be a microsecond difference in time between the pulse wave front indications on the receiving cathode ray oscilloscope screen. If the pulse is one microsecond or longer in duration, the received indications would overlap, and therefore, the two reflecting strata would fail to provide separate indications. This has heretofore not been clearly recognized in the art. The present invention is concerned with definitely limiting the duration of the pulse to a relatively small fraction of a microsecond to avoid the possibility of overlapping of the received reflections.

Referring now to the drawings, and more particularly to Figures 1, 4, 5 and 8, 11 designates a pulse generator arranged to apply pulses to the surface of the earth, shown at 12, by means of electrodes 13, 13, said electrodes, for example, being suitable plates spaced apart from four to six feet and being connected by a short line to the output of the pulser 11. The pulser is energized by a suitable power supply 14, which also energizes the receiver, shown at 15. Connected to the output of receiver 15 is an oscilloscope 16 whose sweep circuit is synchronized with the pulser 11.

As shown in Figure 1, receiving electrodes 17, 17 are provided at a distance of the order of 100 feet from the transmitting electrodes 13, 13, said receiving electrodes being connected by a short line to a pre-amplifier 18. The output of the pre-amplifier 18 is connected by a suitable line 24 to the receiver 15.

In the above system, a high power pulse from the pulser 11 having a duration of a fraction of a microsecond is applied by the plates 13, 13 to the earth and travels by different reflected paths, such as shown for example at 19 and 23, to the receiving plates 17, 17. The path 19 is obtained by reflection from the interface 20 between adjacent formations 21 and 22. The path 23 is obtained by reflection from the interface between formation 22 and the next subadjacent formation. A large number of different reflective paths for the pulse therefore may exist between the transmitting plates 13, 13 and the receiving plates 17, 17, the locus of each path being determined by the location of an underground reflecting interface.

The pulse reflections are picked up by the receiver plates 17, 17, and, after amplification in the pre-amplifier 18, are transmitted by the line 24, which is preferably a coaxial line, to the receiver 15. After further amplification in the receiver 15, the pulses are applied to the plates of the oscilloscope 16, and the various reflections appear as separate pips on the oscilloscope trace. By taking a series of photographs of the oscilloscope traces along a given survey line, a profile chart of the underground strata may be obtained, as in Figure 9.

The pulse is preferably of the order of ¼ microsecond in duration, and a negative pulse of approximately 10 kw. is employed in order to obtain reflections from a depth of 2000 feet or more.

The pulser 11 is a typical hard tube pulser such as is employed in radar and is of standard construction, except that instead of applying the pulse to a magnetron or other radio frequency generator, the pulse is applied to the earth. Referring to Figures 4 and 5, it will be seen that a 6C4 is employed as a free-running blocking oscillator. This is set to provide a ½ microsecond pulse at a frequency of about 2500 cycles per second. The 6C4 tube is used to trigger the sweep generator for the oscilloscope 16 by a positive pulse 26 at "A." The output wave 27 at "B" is used to trigger the type 807 driver tube, which is also a line-controlled blocking oscillator set to provide a pulse 28 of about ¼ microsecond duration at its output, as shown at "C." The output of the 807 tube is used to drive the pulse tube, shown as a type 3E29 tube, biased to cut-off. The 20-ohm resistors in the plate and grid leads of the 3E29 tube are provided to prevent high-frequency parasitic oscillations. A square negative pulse 30, shown at "D," of a duration of about ¼ microsecond therefore appears across the output terminals of the pulser.

The receiver 15 may be merely a conventional video amplifier, or may comprise an oscillator connected to a wide-band I. F. amplifier. The pre-amplifier 18, shown in detail in Figure 8, comprises two stages of video amplification with a cathode follower output stage connected to the coaxial line 24. Line 24 is about 100 feet long and is terminated by a 50-ohm resistor 25 at its connection to the receiver 15, so that no oscillations will be set up in the line.

The pre-amplifier 18 serves two purposes: it amplifies the short pulses reflected by underground strata, and drives the coaxial line 24 from the low-impedance cathode follower. This, with the 50-ohm resistor at the receiver end of the coaxial line insures the transmission of the signals without any reflections from the ends of the line.

A hard tube pulser is employed at 11 to avoid oscillations due to mismatch between the pulser and ground. If a suitable matching network is employed, a simple line pulser may be employed at 11, whereby higher power may be more easily obtained.

The output pulse is transmitted from the pulser to the earth by a line only a few feet long, so that any oscillations set up therein will be of such high frequency that they will not pass the video circuits.

The electrodes 13, 13 and 17, 17 may comprise capacitive plates placed on the ground, but alternatively, ground rods, or a ground rod and plate for each set of electrodes may be employed.

The signal from the receiver is applied to the oscilloscope, which, as shown in Figure 5, has a triggered sweep 31, synchronized with the output pulse 30. If it is desired to examine any particular depth, a delayed and expanded sweep may be employed.

Figure 2:
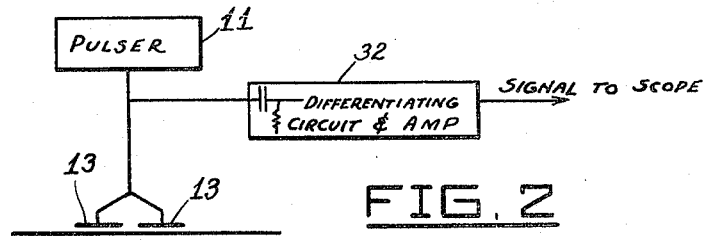
Figure 2 is a partial block diagram showing another form of apparatus for electrical-pulse geophysical prospecting by the method of the present invention, wherein the pulse reflections are collected by the same electrodes used to apply the pulse to the earth.

In the embodiment shown in Figure 2, the reflections are picked up by the same electrodes 13, 13 used to apply the pulse to the earth. In this embodiment, a differentiating circuit and amplifier 32 is employed, arranged so that only the short-time constant reflections are amplified and applied to the oscilloscope. This prevents the oscilloscope trace from being driven off the screen by long-time constant effects. The differentiating circuit is shown in detail in Figure 6. Curve A' in Figure 7 shows the appearance of the trace when the pulser output is connected directly to the oscilloscope. This curve is similar to the trace obtained when the pulse 30 is applied to a capacitor, except for the pips 33 due to reflections. By passing the wave through the small capacitor shunted by the low resistance to ground, as shown in Figure 6, the long-time constant component of the wave is blocked out and only the pips due to the reflections are applied to the video amplifier. The resultant wave obtained at the output of the differentiating circuit is shown at B'.

The system of Figure 2 may be employed to make a rapid survey of a location by mounting the apparatus in a vehicle, which may be employed as a ground, and by employing a trailing wire as the high voltage electrode. In this manner, an area may be surveyed without the necessity of obtaining leases until after the survey.

Figure 3:
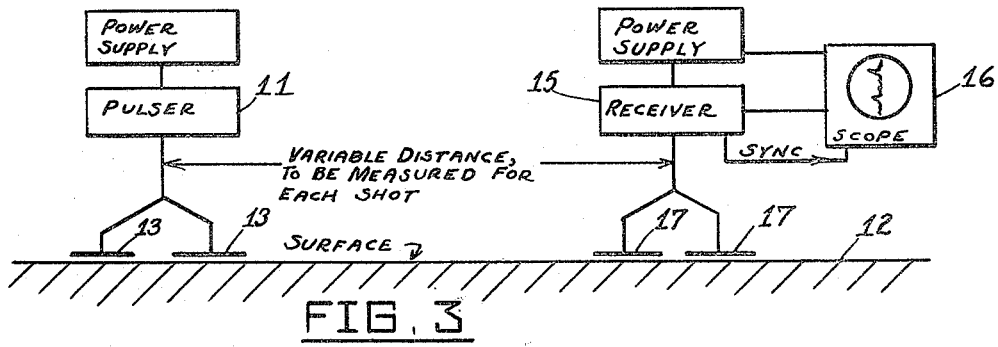
Figure 3 is a block diagram illustrating still another form of apparatus for electrical-pulse prospecting by the method of the present invention, wherein the pulser and the receiver are set up as separate units.

In the embodiment illustrated in Figure 3, the pulser 11 and the receiver 15 are set up as separate, physically spaced units. Thus, the pulser may be set up at a fixed location and the receiver moved to a number of different points, a reading being taken at each point. By measuring the distance between the pulser 11 and the receiver 15 at each point, the total depth to a reflecting surface may be calculated. In this embodiment, the oscilloscope sweep synchronizing signal may be obtained from the first pulse to reach the receiver, or a separate radio frequency circuit may be employed to transmit the synchronizing signal from the pulser to the receiver.

Figure 9:
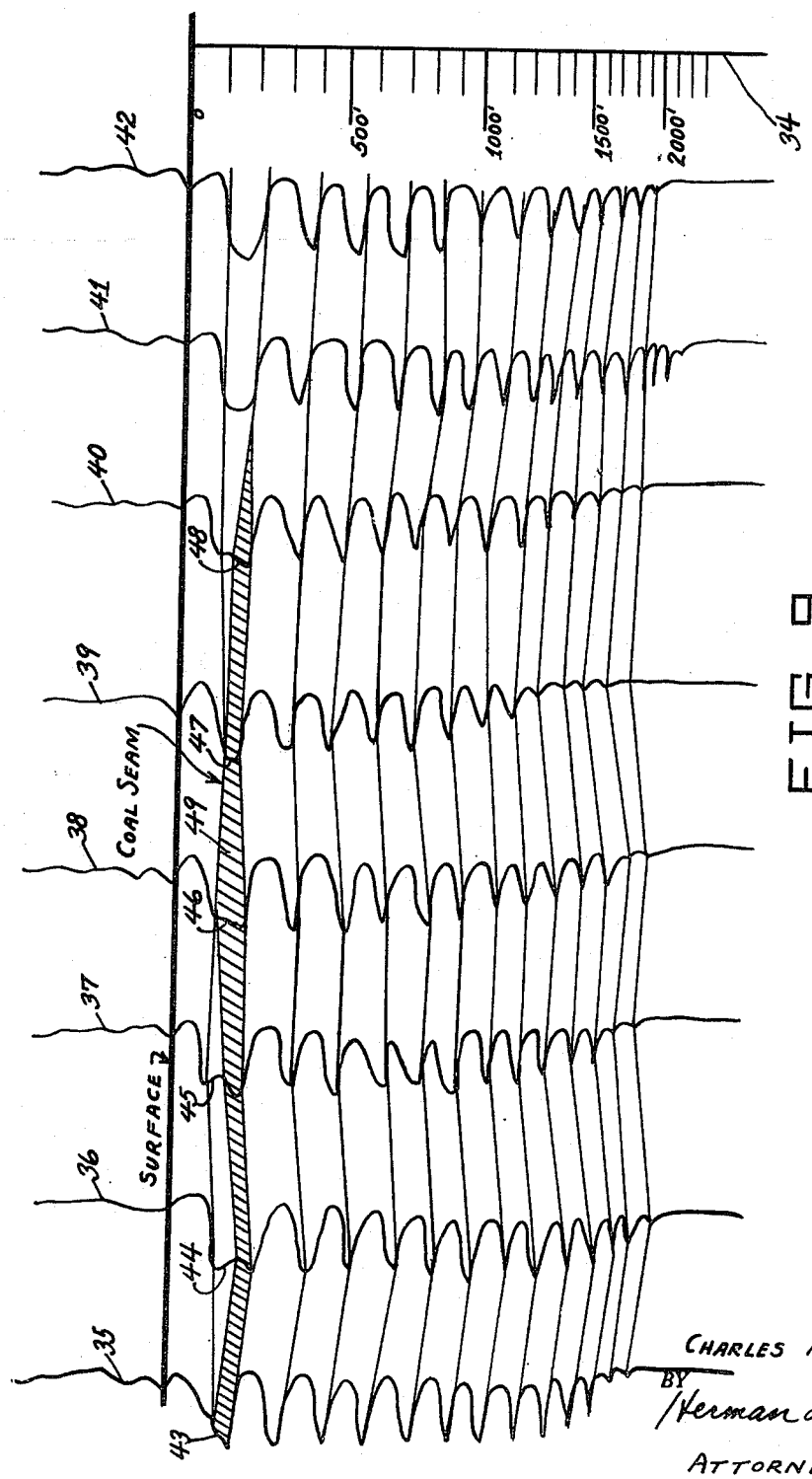
Figure 9 shows a series of oscilloscope indications taken at spaced points along a line of survey, said indications being obtained by the method and means of the present invention and enabling the locations, depths and shapes of underground formations along said line to be plotted.

The oscilloscope screen may be calibrated in any suitable manner to provide a depth chart such as shown at 34 in Figure 9. Said figure shows a series of traces 35 to 42 obtained from reflection tests made at successive stations along a line of survey. Each trace contains spaced pips indicating the presence of interfaces between underground formations. By joining the corresponding pips, a rough cross-sectional profile map of the geological structure along the line of survey may be obtained, as shown in Figure 9.

The curves of Figure 9 represent the results of an actual survey. The traces 35 to 40 exhibit anomalous pip forms at 43 to 48, indicating the presence of an unusual formation at 49. By actual drilling, it was found that the formation 49 was a coal seam, said seam being discovered at a depth of about 150 feet, thereby confirming the results obtained by the pulse survey.

While certain specific embodiments of improved methods and means for electrical geophysical prospecting have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a geophysical prospecting apparatus, the combination of a low frequency generator arranged to provide successive rectangular output pulses, each having a total duration of the order of a fraction of a microsecond, means electrically coupling said generator to the earth, a video receiver including an oscilloscope provided with sweep means, and means synchronizing said sweep means with the output pulses of said generator, said receiver being coupled to the earth at a distance from the generator of the same order as the distance between successive underground interfaces and being arranged to pick up respective reflections of a pulse from successive subsurface formations, said receiver being further arranged to provide separate visual indications of the respective reflections on said oscilloscope.

2. In a geophysical prospecting apparatus, the combination of a low frequency generator arranged to provide successive rectangular output pulses, each having a total duration of the order of a fraction of a microsecond, means electrically coupling said generator to the earth, a video receiver including an oscilloscope provided with sweep means, and means synchronizing said sweep means with the output pulses of said generator, said receiver being coupled to the earth at a distance from the generator of the order of 100 feet and being arranged to pick up respective reflections of a pulse from successive subsurface formations, said receiver being further arranged to provide separate visual indications of the respective reflections on said oscilloscope.

3. In a geophysical prospecting apparatus, the combination of a low frequency generator arranged to provide successive rectangular output pulses, each having a total duration of the order of a fraction of a microsecond, means electrically coupling said generator to the earth, a video receiver including an oscilloscope provided with sweep means, means synchronizing said sweep means with the output pulses of said generator, pickup means spaced a distance from said generator of the same order as the distance between successive underground interfaces and electrically coupled to the earth, and means electrically connecting said pickup means to the receiver, whereby reflections of a pulse from successive subsurface formations will be detected by said pickup means and transmitted to said receiver, said receiver being arranged to provide separate visual indications of the respective reflections on said oscilloscope.

4. In a geophysical prospecting apparatus, the combination of a low frequency generator arranged to provide successive rectangular output pulses, each having a total duration of the order of a fraction of a microsecond, means electrically coupling said generator to the earth, a video receiver including an oscilloscope provided with sweep means, means synchronizing said sweep means with the output pulses of said generator, pickup means spaced a distance from the generator of the same order as the distance between successive underground interfaces and electrically coupled to the earth, a transmission line connecting said pickup means to the receiver, whereby reflections of a pulse from successive subsurface formations will be detected by said pickup means and transmitted to said receiver, relatively low-resistance means connecting the ends of said transmission line to the earth, and means associated with the receiver arranged to provide separate visual indications of the respective reflections on said oscilloscope.

5. In a geophysical prospecting apparatus, the combination of a generator arranged to provide a rectangular output voltage pulse having a total duration of the order of a fraction of a microsecond at a relatively low frequency, means at said generator electrically coupling the output of said generator to the earth, a video receiver including an oscilloscope provided with sweep means, means synchronizing said sweep means with the output pulse of said generator, a pickup electrode coupled to the earth and spaced from said generator a distance of the order of the distance between successive underground interfaces, and means electrically connecting said electrode to the input of said receiver, whereby respective reflections of the pulse from successive interfaces between subsurface formations will be detected by said electrode and transmitted to said receiver, said receiver being arranged to provide separate visual indications on said oscilloscope of the respective reflections, spaced in accordance with the different time periods required for the respective reflections to reach the electrode.

6. In a geophysical prospecting apparatus, the combination of a generator arranged to provide a rectangular output voltage pulse having a total duration of the order of a fraction of a microsecond at a relatively low frequency, means at said generator electrically coupling the output of said generator to the earth, a video receiver including an oscilloscope provided with sweep means, means synchronizing said sweep means with the output pulse of said generator, a pickup electrode coupled to the earth and spaced from said generator at a distance of the order of the distance between successive underground interfaces, a transmission line connecting said electrode to the input of the receiver, whereby respective reflections of the pulse from successive interfaces between subsurface formations will be detected by said electrode and transmitted to said receiver, and a relatively low resistance connecting the receiver end of said line to the earth, said receiver being arranged to provide separate visual indications on said oscilloscope of the respective reflections spaced in accordance with the different time periods required for the respective reflections to reach the electrode.

CHARLES A. DONALDSON.

References Cited in the file of this patent

UNITED STATES PATENTS

| Number | Name | Date |
| --- | --- | --- |
| 1,838,371 | Deardorff | Dec. 29, 1931 |
| 2,077,707 | Melton | Apr. 20, 1937 |
| 2,139,460 | Potapenko | Dec. 6, 1938 |
| 2,165,214 | Blau | July 11, 1939 |
| 2,172,688 | Barrett | Sept. 12, 1939 |
| 2,280,226 | Firestone | Apr. 21, 1942 |
| 2,423,024 | Hershberger | June 24, 1947 |
| 2,426,501 | Hart | Aug. 26, 1947 |
| 2,426,918 | Barrett | Sept. 2, 1947 |
| 2,438,836 | Wolff | Mar. 20, 1948 |
| 2,498,381 | Smith | Feb. 21, 1950 |

OTHER REFERENCES

"Preliminary Note on an Automatic Recorder Giving a Continuous Height Record of the Kennelly-Heaviside Layer," by T. R. Gilliland and G. W. Kenrick; Research Paper No. 373, Reprint from Bureau of Standards Journal of Research; vol. 7, November 1931. Copy in Division 51 343–5.